United States Patent [19]

Wolff et al.

[11] Patent Number: 5,633,593
[45] Date of Patent: May 27, 1997

[54] APPARATUS FOR SENSING PROXIMITY OF A MOVING TARGET

[76] Inventors: George D. Wolff, 2929 Dundee Rd., Winter Haven, Fla. 33884; Marshall E. Smith, Jr., P. O. Box 7, Eaton Park, Fla. 33840; George T. Ruck, 6812 Bowerman West, Worthington, Ohio 43085

[21] Appl. No.: 454,696

[22] Filed: May 31, 1995

Related U.S. Application Data

[62] Division of Ser. No. 703,269, May 22, 1991, Pat. No. 5,459,405.

[51] Int. Cl.$^6$ ............................ G01R 27/00; G01S 13/04
[52] U.S. Cl. ............................ 324/644; 324/629; 324/632; 342/127; 342/458
[58] Field of Search ........................... 324/632, 637, 324/638, 642, 644, 645, 646, 662, 671, 699, 701, 629, 332, 207.26; 342/360, 458, 127, 128; 340/551, 552, 553, 572; 73/861.77

[56] References Cited

U.S. PATENT DOCUMENTS

| | | |
|---|---|---|
| 3,395,718 | 8/1968 | Wolff . |
| 3,530,672 | 9/1970 | Wolff . |
| 3,556,154 | 1/1971 | Kramer ............................ 137/625.64 |
| 3,574,475 | 4/1971 | Wolff ............................ 415/17 |
| 3,587,540 | 6/1971 | Hofmann et al. ............ 123/102 |
| 3,648,798 | 3/1972 | Jania ............................ 180/105 E |

(List continued on next page.)

FOREIGN PATENT DOCUMENTS

| | | |
|---|---|---|
| 2239640 | 2/1974 | Germany . |
| 2357381 | 5/1974 | Germany . |
| 1448487 | 9/1976 | United Kingdom . |
| 2034479 | 6/1980 | United Kingdom . |
| 8500428 | 1/1985 | WIPO . |

OTHER PUBLICATIONS

Masashi Kasaya Tatsuhiko Abe, "A Contact–Point Type Start of Injection Sensor for Diesel Engines," SAE Paper 851585, International Congress & Exposition, Detroit, Michigan, Sep. 1995.

Jean–Pierre Floquet, "Advanced Sensing and Switching Techniques," Sep., 1989.

(List continued on next page.)

*Primary Examiner*—Maura K. Regan
*Assistant Examiner*—Diep Do
*Attorney, Agent, or Firm*—Allen, Dyer, Doppelt, Franjola & Milbrath, P.A.

[57] ABSTRACT

An apparatus for sensing the proximity of a moving target is provided which includes a sensor for sensing a range of distances between a reference point and a moving target. The sensor preferably has a detector for detecting a distance signal representative of a range of distances between a reference point and a moving target and a maximum and minimum generator responsive to the detector for generating a maximum distance range DC voltage signal representative of a maximum distance range value between a reference point and a moving target and for generating a minimum distance range DC voltage signal representative of a minimum distance range value between a reference point and a moving target. The sensor also preferably includes a memory device responsive to the maximum distance range signal and the minimum distance range signal for storing the maximum and minimum distance range DC voltage signals during a predetermined time period, a range value generator responsive to the memory device for generating a range value signal having an amplitude representative of a range value between the maximum distance range value and the minimum distance range value, and an output signal generator responsive to the range value signal for generating an output signal when the amplitude of the range value signal exceeds a predetermined threshold.

10 Claims, 4 Drawing Sheets

U.S. PATENT DOCUMENTS

| | | | |
|---|---|---|---|
| 3,659,571 | 5/1972 | Lang | 123/102 |
| 3,699,935 | 10/1972 | Adler et al. | 123/102 |
| 3,747,105 | 7/1973 | Payne | 342/418 |
| 3,777,174 | 12/1973 | Butscher et al. | 290/40 |
| 3,800,755 | 4/1974 | Klaiber et al. | 123/102 |
| 3,832,709 | 8/1974 | Klein et al. | 342/127 |
| 3,832,846 | 9/1974 | Leeson | 60/39.28 |
| 3,925,774 | 12/1975 | Amlung | 340/553 |
| 3,978,837 | 9/1976 | Lundberg | 123/139 E |
| 4,346,383 | 8/1982 | Woolcock et al. | 324/644 |
| 4,366,706 | 1/1983 | Wolff | 73/119 A |
| 4,375,057 | 2/1983 | Weise et al. | 324/644 |
| 4,384,819 | 5/1983 | Baker | 324/644 |
| 4,386,522 | 6/1983 | Wolff | 73/119 A |
| 4,397,180 | 8/1983 | Wolff et al. | 73/119 |
| 4,419,622 | 12/1983 | Cuneo, Jr. et al. | 324/629 |
| 4,614,111 | 9/1986 | Wolff | 73/119 |
| 4,687,994 | 8/1987 | Fulkerson et al. | 324/251 |
| 4,887,215 | 12/1989 | Kumagai et al. | 364/431.04 |
| 4,983,914 | 1/1991 | Baranski | 324/207.26 |
| 5,072,172 | 12/1991 | Stolarczyk et al. | 324/332 |
| 5,097,227 | 3/1992 | Yuan et al. | 324/327 X |

OTHER PUBLICATIONS

Janusz Bryzek, "The Evolution of Smart Sensor and Transducer Design," Sensors, Oct., 1993.

Andrei Moldoveanu, "Solid–State Sensing," Measurements & Controls, Jun., 1995.

Wolff Controls Corp., "Needle Lift Sensor Design Guide – Analog Sensor" 1987, month unavailable.

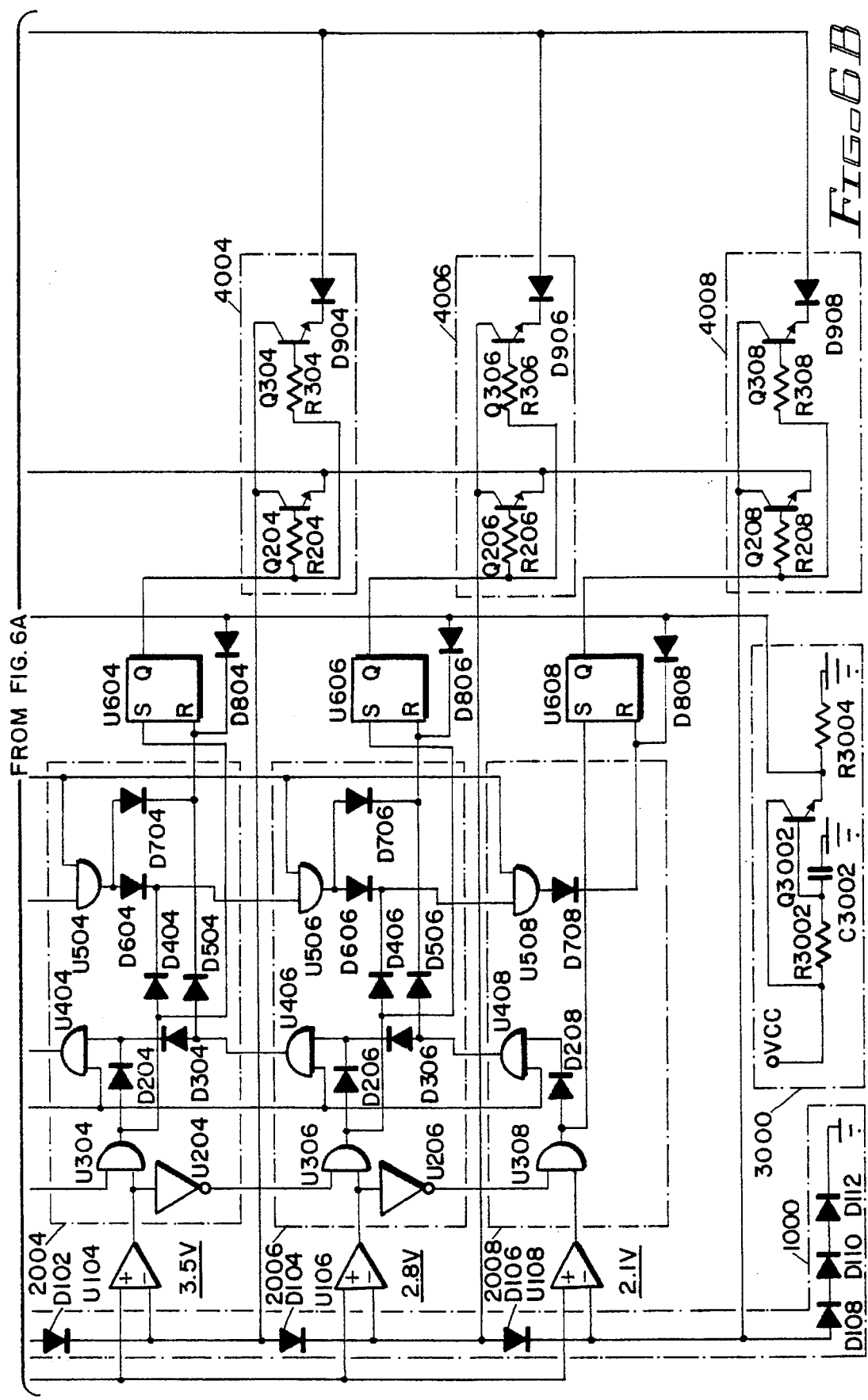

APPARATUS FOR SENSING PROXIMITY OF A MOVING TARGET

This is a divisional of application Ser. No. 07/703,269 filed May 22, 1991, now U.S. Pat. No. 5,459,405.

BACKGROUND OF THE INVENTION

This invention relates to sensing proximity of a target using an electronic sensor, and more particularly, using a sensor that responds to near-field electromagnetic effects to sense the position of a small object. This invention also relates to sensing the position of a gear by determining when a signal voltage is at some predetermined point between two fixed extremes and furnishes a change of state when the signal voltage reaches a predetermined threshold value between these extremes.

Numerous proximity sensors are known in the art that react to various parameters of the target: These electromagnetic proximity sensor devices, such as Hall effect devices, Wiegand effect devices, eddy-current killed oscillators, etc., have the general disadvantage that they require that the target be constructed of a ferrous or magnetic material and that the device be located in very close proximity to the target. Further, these devices cannot distinguish between non-target objects that move in close proximity to the target and the target itself. Other electromagnetic proximity sensor devices such as microwave proximity sensors use radar techniques, such as the Doppler effect, to sense large targets at long distances from the sensor. Prior art electromagnetic devices are not designed to sense small objects at close distances and are both bulky and expensive.

The most common use of a proximity sensing circuit is tracking the rotational movement of a gear. As each gear tooth passes across the front of the proximity sensing circuit, a changing signal is generated. The changing signal voltage is highest when the sensor is directly in front of the face of a gear tooth and lowest when facing the valley between gear teeth. Allowing for small tolerances, the maximum voltage will be the same for each tooth, and the minimum voltage will be the same for each valley. Therefore, the signal will always fall between these two values.

When the gear is rotating at constant velocity, the signal will resemble a sine wave. The proximity sensor has a set area in which objects influence its output. If the gear tooth or valley is larger than the area of influence of the sensor, the signal resulting from its movement will tend to remain at a maximum or minimum value for some period of time. Also, since signal waveform at these two extremes is relatively flat, any electromagnetic noise from the environment surrounding the sensor or from the proximity sensor components themselves will be superimposed on the waveform.

The result is that the maximum and minimum vales are not suitable as trigger points to reliably cause the output state of the signal conditioner to change. This is because each peak of the noise voltage may cause the signal conditioner to trigger. Many of these peak voltages may be present on the signal, causing any number of state changes for a single gear tooth. The best point at which to trigger is some point midway between the maximum and minimum. This is because the signal waveform at this time has a steep slope. This ensures that the voltage at any one time is probably at the threshold value only once during the transition from maximum to minimum. Any noise riding on the signal will change in level rapidly as a result of its riding on the steep slope. Should any noise cause false triggering during this time, the error, if any, (expressed in degrees of rotation) will be very small due to the relatively small amount of time that the signal remains at the trigger point. This is the point at which a gear tooth is halfway across the front of the sensor.

Another common task for the proximity sensor is to measure the opening and closing of a valve. The sensor is normally placed so the valve approaches the sensor when opening and goes away from the sensor when closing. For this application, the signal conditioning circuitry should change state when the flow begins, and again when the flow ends. Due to inertial forces, the valve does not immediately become fully open, but begins to rise relatively slowly, reaches its peak, falls to its rest position, then may bounce once or a few times. The optimum threshold point for this application is just above the signal value obtained when the valve is at rest. However, noise may again be present to cause false triggering, and second, the bounce signal may cause the signal conditioner to change states each time the valve bounces. The signal conditioner can be prevented from being triggered by the noise and bounce signals by moving the threshold just above the opening point. This does not pose a problem in most applications, as little flow occurs until the valve is an appreciable distance off its seat. The optimum threshold in this case is approximately 2 to 10 percent of the total movement of the valve.

To convert the signal to a square-wave pulse the signal is usually compared to a DC threshold voltage in a comparator. When the signal is higher in voltage than the DC threshold, the comparator usually delivers a positive going pulse. When the signal falls below the threshold, the comparator changes back to the off state with an output near zero volts.

By the proper selection of the threshold voltage, the comparator can be made to switch when the target is at some percentage of distance between its minimum and maximum excursions. The key is knowing the precise signal voltage at this point.

The problem lies in the fact that due to manufacturing tolerances, various target sizes and movements, and varying installations, the signal can range over a wide value of voltages. Installations may require differing distances from the sensor to the target, and mechanical tolerances may mean that identical targets in similar mechanisms move different amounts. Sensor manufacturing tolerances may deliver different gains and internal reference voltages that can cause different signal voltages from each proximity sensor at both the minimum and maximum excursions of identical targets. Any stationary targets in the area of influence of the proximity sensor will also add to the signal voltage.

Because of these factors, a signal minimum and maximum may range from 4 to 5 volts, another from 3 to 4, another from 1 to 1.5, etc. The task for the signal conditioner is to determine the difference between the maximum and the minimum signal voltages and to use some percentage of this difference to generate a threshold voltage to cause the comparator to change state at the appropriate time.

Historically, there have been two general methods for solving this problem. The analog approach attempts to solve this problem by passing the signal through a capacitor to return any offset back to zero volts. (This means that a signal of 4 to 5 volts becomes 0 to 1 volt, a signal of 3 to 5 volts becomes 0 to 2, etc.)

The problem with feeding the signal through a capacitor is that a capacitor effectively blocks any signal from the sensor that is very low in frequency (as is the case with slow moving targets). This means that the analog method cannot be used for zero speed detection. Below a certain rate of movement, the sensor will not be able to tell that the target is moving because the signal is so close to a steady DC voltage that it will not pass through the capacitor.

A digital approach has been pursued wherein the signal from the target has been converted to a digital number, stored in memory, then reconverted into an analog voltage to use as the threshold. The problems with this approach are: It requires a very large number of components to be realized, thus is complex, relatively expensive, and is large in area. The second problem is that it suffers from two conversion inaccuracies: when the signal is converted from analog to digital, and again when it is converted back to analog form. The solution of either one of these two problems causes an increase in the problems caused by the other condition. The overall accuracy can be increased only by increasing the component count exponentially, and the component count can only be reduced by decreasing the accuracy.

SUMMARY OF THE INVENTION

An objective of this invention is to provide an improved proximity sensor that detects movement of small targets.

An objective of the invention is to generate resultant output from sensing a valve or a gear that is a square-wave pulse that changes state when the signal voltage being monitored passes through a predetermined threshold value.

An objective of the invention is to generate resultant output from sensing a valve or a gear that is an analog waveform that has as its lowest value a voltage approximating zero and whose value is proportional to the position of a target.

Another objective of this invention is to sense the position of a small target while distinguishing the position of the small target from the position of objects that move in close proximity to the target.

Also an objective of this invention is to simplify manufacture of a proximity sensor by attaching an external antenna directly to a chip pad of the sensor.

It is also an objective of this invention to package a sensor that can be simply secured to a wall and may easily be removed.

A further objective of this invention is to position a proximity sensor within a small space that can detect the movement of a small target.

Another objective of the invention is to achieve the desired threshold voltage for a target moving with any speed down to zero, yet do so without an inordinate amount of components.

An additional objective of this invention is to simplify manufacture of a sensor that has a semiconductor circuit by surrounding the circuit with encapsulation material that forms an antenna.

A further objective of the invention is to insert a sensing apparatus in a ceramic cone bonded to a metal tube and molding the tube to an electrical connector to secure the sensory apparatus in place while allowing the length of the sensor to be changed by trimming the metal tube.

This invention accomplishes the preceding objectives by positioning an antenna that radiates radio frequency energy in close proximity to the target. The radio frequency signal is then fed to the antenna resulting in a narrow electromagnetic field radiating from the antenna and charging the surface of the target, as well as the radio frequency signal reflecting back toward the source. When the position of the target changes, the impedance of the antenna, as well as the amplitude of the radio frequency signal, changes due to a near-field effect. The change in the signal's amplitude is then detected to provide an indication of target movement.

It is preferable that all sensing and signal conditioning components be arranged on a single integrated circuit that will permit packaging in a very small and inexpensive device. In this fashion small, high frequency devices (required for close range acquisition of small targets) can be easily integrated. The circuitry is realized on either a silicon substrate with dielectric insulation (such as SIMOX, manufactured by IBIS Technology Corp. of Danvers, Mass.) to provide operation at high temperatures, or in gallium arsenide substrate to provide operation at high frequencies to acquire smaller targets.

The preceding objectives may further be accomplished by a method for sensing a position of a target, the method comprising the steps of radiating radio frequency energy with an antenna having an impedance and positioning a moving object adjacent the antenna such that the impedance of the antenna varies with changes in the position of the object as a result of near-field effects. The changes in the impedance of the antenna due to these near-field effects are detected and a signal is provided in response to the changes of impedance of the antenna that indicates that the position of the object has changed. Accordingly, movement of small objects may be detected without giving a false indication due to movements of other objects adjacent the perimeter of the monitor.

Alternatively, the invention includes an apparatus for installing a sensor in the first aperture within a wall of a device, the aperture comprising a plug made with a resilient material and being adapted to being inserted into the first aperture, the plug having a second aperture disposed therein that extends through the plug. A sensor having a connector in a tube inserted into the second aperture, the tube having an upper portion coupled to the connector with a plurality of spiral barbed edges, such that when the tube is inserted into the second aperture, the apparatus remains securely fastened to the wall of the device, and when the tube is rotated the apparatus releases from the device. This apparatus fits a sensor to be mounted within the wall while providing a leak-free seal between the sensor and the wall.

The above objectives are further accomplished by using a network that finds the highest and the lowest signal voltages that represent the total excursion of the target, and then applying these two voltages across a voltage divider network. The appropriate percentage of this voltage is then tapped off and used as a threshold voltage for a comparator. The threshold voltage for a gear tooth can be obtained by tapping the threshold voltage across two equal resistances to achieve a threshold halfway between the maximum and minimum signal values. The threshold voltage for a valve can be obtained by making the top resistor a certain percentage larger than the lower resistor. Both threshold voltages can be achieved by using three resistors. The top resistor will be equal to the sum of the two lower resistors, and the lowest resistor will be a value equal to the percentage of the total resistance required to bring the threshold to the desired percentage of movement of the target. For example, for a threshold of 50% and 10%, the top resistor could be 50 ohms, the second 40, and the third 10. Any number of thresholds can be obtained by proper selection of the number and values of resistors. The selection of the threshold point can then be determined by selecting the appropriate tap-off point.

BRIEF DESCRIPTION OF THE DRAWINGS

FIG. 2b is a sectioned side view of the sensor cut along lines 2b—2b of FIG. 2a.

DESCRIPTION OF THE PREFERRED EMBODIMENTS

Figure 1:
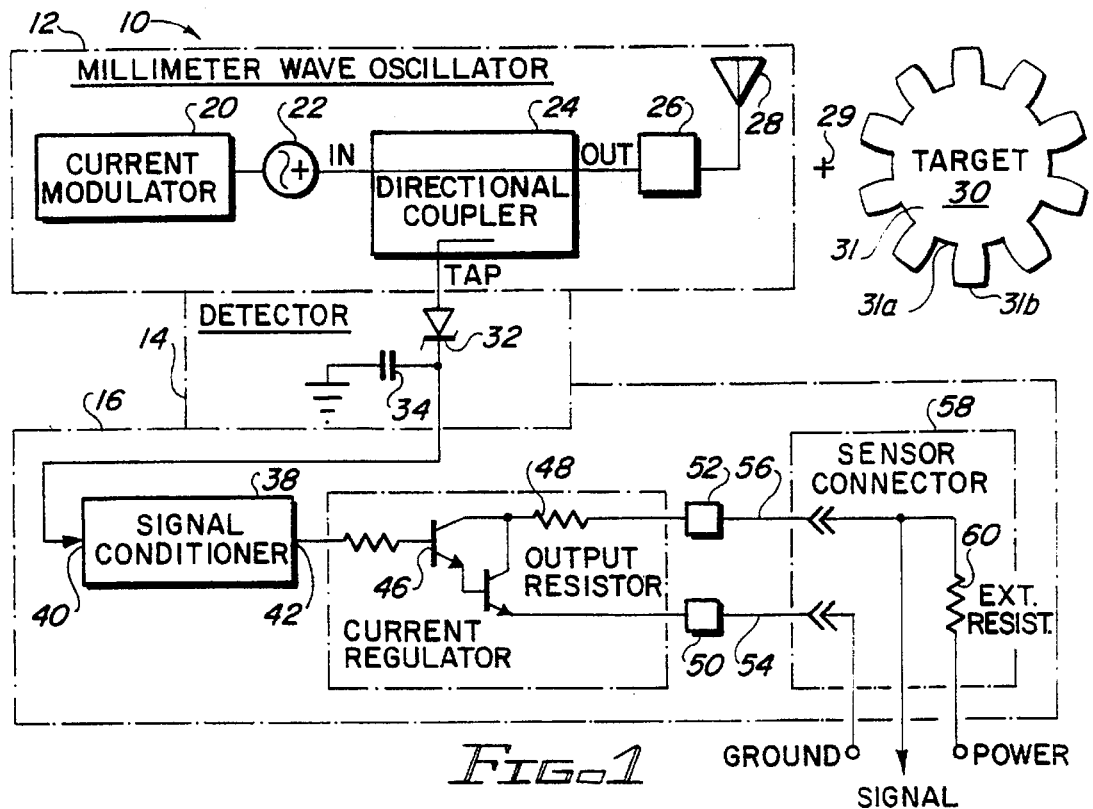
FIG. 1 is a simplified schematic diagram of the circuit.

Referring to FIG. 1, there is shown a simplified schematic diagram of the main sensor circuit components 10 including radiating means 12, detecting means 14, and signal providing means 16. The radiating means 12 include an oscillator 22 that generates radio frequency energy. Oscillator 22 may be any state-of-the-art millimeter wave oscillator, however, the preferred embodiment is an Impact Avalanche Transit Time diode (IMPATT) because it can be easily implemented in silicon and operates at a high frequency and temperature. Oscillator 22 may be comprised of several similar devices that are optimized to operate at radio frequencies through various temperature ranges. Oscillator 22 may also contain power circuits that automatically compensate for temperature or frequency drift in the output level of oscillator 22. These various oscillators also may be automatically switched into the circuit as the temperature changes. Examples of oscillator 22 may include transferred electron devices, IMPATT diodes, trapped plasma avalanche triggered transit time diode, tunnel diode, field effect transistor, bipolar transistor, high electron mobility transistor, or any other solid-state oscillator. Many examples of IMPATT oscillators achieved in monolithic circuits are well known in the art and are composed of IMPATT diodes produced in plainer configuration and surrounded by monolithic ring inductor or other required element(s). Examples of how these IMPATT diodes are manufactured and designed are described in the chapter on "Millimeter Wave Silicon Devices" by P. Russer in *Vacuum*, Vol. 41, Nos. 4–6, pgs. 1033–1037 (1990) published by Pergamon Press and references cited thereon.

The power level of oscillator 22 is kept low (below 500 mW total power) to reduce heat generation and thereby increase the lifetime of the circuit components. The frequency of oscillator 22 is preferably in the range of 50–150 GHz and is selected such that the wavelength of the radio frequency energy emitted from antenna 28 is less than or equal to the smallest distance across the face of a target 30.

One such target is gear 31 having a valley 31a and a geartooth 31b forming an undulating and/or uneven surface as illustrated in FIG. 1.

Radiating means 12 also include a modulator 20 and a directional coupler 24. The output signal from oscillator 22 is modulated by the modulator 20. The modulation frequency is preferably higher than the frequency of change of target 30 movement and is selected to eliminate low frequency noises generated by circuit components. Modulating the output signal of oscillator 22 to a 50/50 or less duty cycle decreases heat generated and reduces power demands of the sensor. The modulated radio frequency output signal is then passed through the output connection of directional coupler 24 to antenna means 28 radiating through a reference point 29. Antenna 28 is connected with conductive epoxy to directional coupler 24 through pad 26.

Antenna 28 then transmits the modulated radio frequency signal through a gap between antenna 28 and an object or target 30. The radio frequency signal charges the surface of target 30. The amount of energy contained in the reflected modulated radio frequency signal depends on the composition of target 30 and on the distance between target 30 and antenna 28. It is preferable that target 30 be a conductor, semi-conductor, or ferrous material. It is recognized that the impedance of antenna 28 changes as a function of target 30 to antenna 28 distance. The modulated radio frequency signal is partially reflected from antenna 28 back into the directional coupler 24 through the tap of the directional coupler 24 which along with the detecting means or detector 14 are an example of means for sensing the distance or range of distances between the reference point 29 and the moving target 30 such as a gear illustrated. Due to the directional nature of directional coupler 24, the majority of this energy is not returned to oscillator 22 but is fed to detecting means 14.

Detecting means 14 includes a detector 32 and a low pass filter 34. The detector 22 rectifies the alternating voltage from the directional coupler 24 into a DC voltage signal that is directly proportional to the distance from target 30 to antenna 28. The low pass filter 34 passes only the predetermined low frequency signal that is proportional to the distance from target 30 to antenna 28 and blocks the high frequency radio signal from oscillator 22 and the modulating signal from modulator 20. The DC voltage signal is then passed to signal providing means 16.

The output of the signal conditioner 38 is connected to a current regulating network 44 comprised of transistor stage 46 and output resistor 48. Current regulating network 44 may also be comprised of a multiplexing circuit that is well know in the art or that may be determined at a later date. This network is placed in parallel with the sensor and in series with the power supply through an external current sensing resistor 60. The current regulator network 44 causes a current signal to be shunted through external resistor 60 as the target goes through its range of movement and, as determined by the signal conditioner, is either an analog signal proportional to the position of the target or else is a digital pulse that switches as the target passes through a predetermined position. This current causes a voltage drop across external resistor 60 to change. External voltage monitoring equipment then senses this voltage change to determine the position of the target 30. Sensor components 10 are connected with conductive epoxy at pads 50 and 52 to output wires 54 and 56 respectively out through sensor connector 58 to external power supply and signal monitoring circuits. Sensor connector 58 is composed of two push-in type electrical connectors.

Figure 2A:
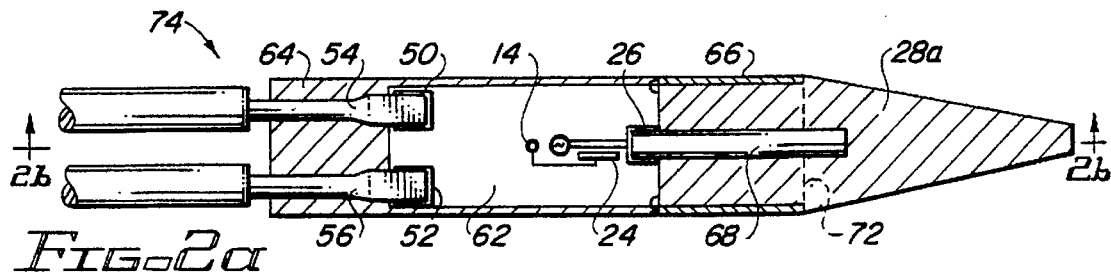
FIG. 2a is a partially sectioned top view of the cone antenna version of the sensor components as they are located within an encapsulation device with the encapsulation device's perimeter represented by the dotted line.
Figure 2B:
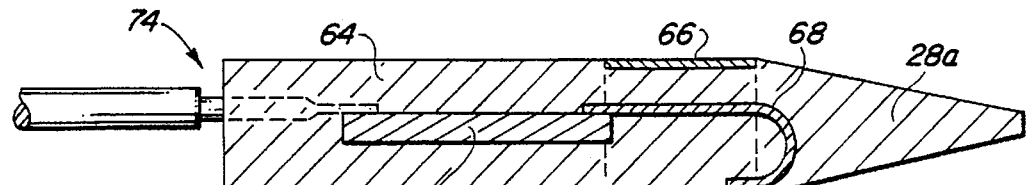
Figure 3:
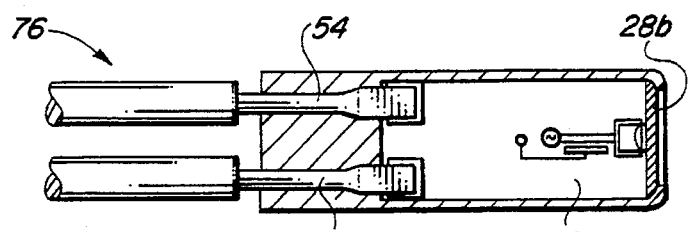
FIG. 3 is a sectioned top view of an alternate embodiment of the sensor shown in FIG. 2a with the metal plate used as an end-fired antenna.

Referring to FIGS. 2a and 2b, there is shown the conical antenna sensor apparatus 74 that includes the above described main circuit components which are formed on chip 62. Chip 62 is connected with conductive epoxy at pads 50 and 52 to output wires 54 and 56 respectively. Wires 54 and 56 are flattened on the end to provide more surface area to contact pads 50 and 52 to increase the strength of the bond. Chip 62 is enclosed with an encapsulation material 64 which is preferably the same material used in forming the dielectric cone antenna 28a. Thus, chip 62 and its associated components may be encapsulated in one molding operation, forming sensing apparatus 74 and 76 as shown in FIGS. 2a, 2b, and in FIG. 3. It is recognized that there may be advantages to removing some of the components from chip 62 structure and combining the removed components, such as a resonator (not shown) is oscillator 22 with the antenna 28 structure.

There are two preferred embodiments for antenna 28. The first is conical antenna sensing apparatus 74 which employs a mode converter ring 66 connected to a dielectric cone antenna 28a. The mode converter ring 66 is attached to the directional coupler 24 through a strip of metal 68 bonded to a connecting pad 26 with conductive epoxy and to antenna mode converter ring 66 at its far end 72.

The second embodiment is end-fired antenna sensing apparatus 76 which employs a metal plate that constitutes an end-fired antenna 28b. The selection of antenna 28(a or b) depends on the size of target 30 to be sensed and on restrictions placed on the length of the sensor. The dielectric cone antenna 28a has a narrower beamwidth and can therefore sense a smaller target 30, but is considerably longer than the end-fired antenna 28b. The output wires 54 and 56, mode converter ring 66, and end-fired antenna 28b are attached to chip 62 by conductive epoxy.

Figure 4:
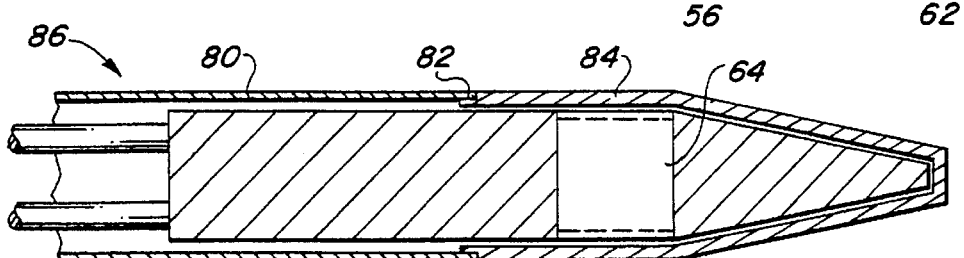
FIG. 4 is an enlarged cross-sectional view of the assembled sensor tip.

Referring now to FIG. 4, sensing apparatus 74, as shown in FIG. 2a and FIG. 2b is inserted into a stainless steel tube 80 to form a sensor 86. As shown in FIG. 4, the end of stainless steel tube 80 is closed with a ceramic cap 84 which is brazed to the end of stainless steel tube 80 at ring area 82 forming a hermetic connection. In this fashion all sensor components 10 are shielded from contamination which may be present in the sensing environment. Ceramic cap 84 is transparent to microwave and millimeter-wave signals.

Figure 5:
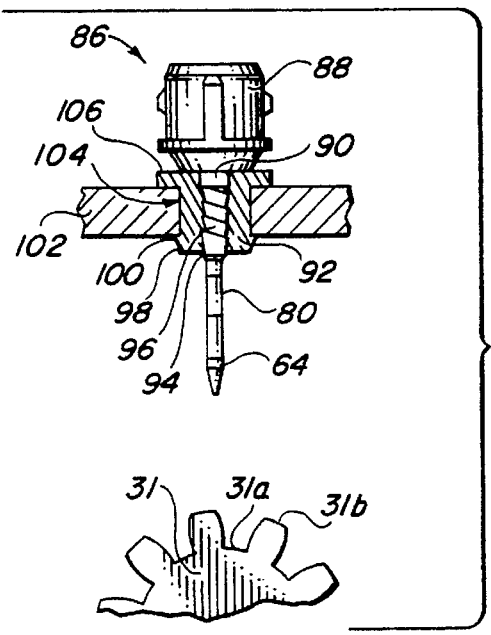
FIG. 5 shows the assembled sensor as installed in the wall of a housing.

Referring to FIG. 5, stainless steel tube 80 is molded into electrical connector body 88. Output wires 54 and 56 (FIG. 4) are connected to connector 58 blades (not visible) in the electrical connector body 88, preferably by using welding techniques known in the art. Spiral barbs 96 are formed during the molding process about the upper end portion of the stainless steel tube 80 such that they constitute an integral part of connector body 88. A cylindrical section 90 is formed during the molding process between spiral barbs 96 and the connector body 88. Molding compound also enters stainless steel tube 80 and secures sensing apparatus 74. A synthetic rubber plug 92 or any plug using a resilient material is located in an aperture 104 through the housing wall 102 in a position to sense the moving target.

The sensor 86 is installed as follows: First a simple aperture 104 is drilled into housing wall 102. Into this aperture 104 rubber plug 92 is inserted to the point that its shoulder 106 bears against wall 102. At the end of the portion of rubber plug 92 which is to be inserted into wall 102 there is located a conical section 98 with a small shoulder 100. Conical section 98 is arranged such that after the insertion of plug 92 the small shoulder 100 expands diametrically beyond the hole diameter in wall 102 thus arresting plug 92 in the hole and preventing it from being pulled out.

After rubber plug 92 has been inserted into the hole, the entire sensor assembly is inserted into central aperture 94 in plug 92. The diameter of central aperture 94 in plug 92 is selected such that the sides of central aperture 94 interfere with barbs 96 and cylindrical section 90 of sensor 86. This interference expands rubber plug 92 when sensor 86 is inserted and thus secures plug 92 and the sensor assembly in aperture 104 of housing wall 102. The above insertion process seals aperture 104 against fluids which may be present in the sensing environment from leaking through wall 102, and against contamination which may be present externally. To enhance sealing between rubber plug 92 and sensor 86, cylindrical section 90 is provided so that any fluids which may enter between rubber plug 92 and barbs 96 cannot leak through aperture 94.

While sensor 86 can be installed by simply inserting it into aperture 94 of rubber plug 92, it cannot be removed in the same fashion due to barbs 96, but sensor 86 has to be removed by unscrewing it, thus affording safety against accidental pullout.

All electronic components except the mode converter ring 66 (if used) and the antenna 28(a or b) are constructed on the same monolithic integrated circuit in a compact electronic package on chip 62. The integrated circuit includes a silicon substrate with dielectric insulation that is preferably SIMOX to provide operation at high temperatures or gallium arsenide to provide high frequency operation.

Figure 6A:
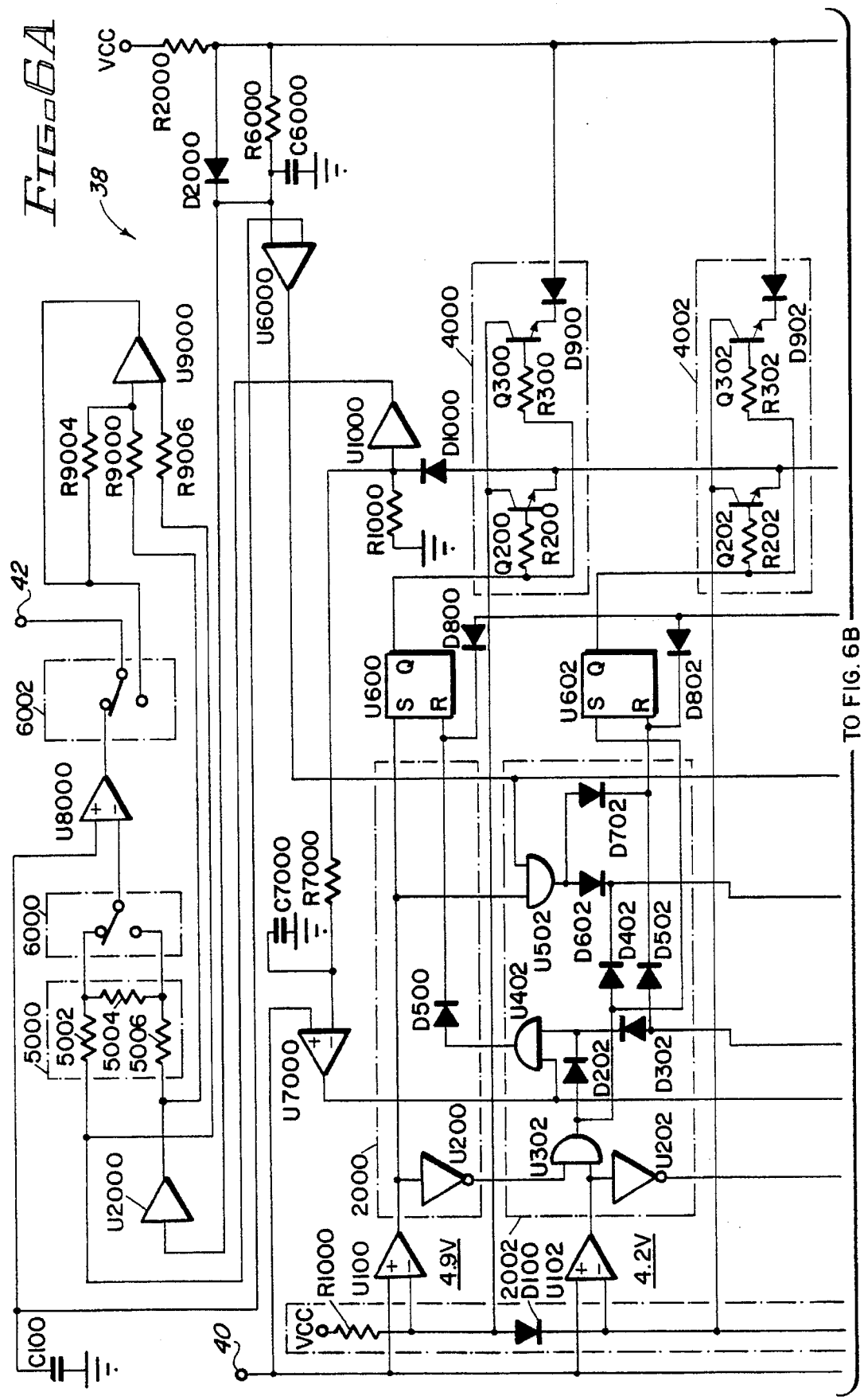
FIG. 6 shows an alternate embodiment of the signal providing means shown in FIG. 1 that conditions a signal from the sensor shown in FIG. 2a and generates an output pulse used in sensing the position of a target moving as slow as zero speed.

Referring to FIGS. 1 and 6, there are shown the preferred signal conditioning means 38 (FIG. 1) having an input terminal 40 (FIG. 6) and an output terminal 42. Input terminal 40 is coupled to detecting means 14 (FIG. 1). The signal conditioning means 38 place appropriate high and low voltages across threshold selection resistors $R_{5002}$, $R_{5004}$, and $R_{5006}$ by placing them on two buses, Bus Hi 200 and Bus Lo 300. Signal conditioning means 38 include a plurality of comparators $U_{100}$–$U_{108}$ coupled through logic elements 2000–2008, flip-flops $U_{600}$–$U_{608}$ and bus drives 4000–4008. Logic elements 2000–2008 include inverters $U_{200}$–$U_{206}$, AND gates $U_{302}$–$U_{308}$, $U_{402}$–$U_{408}$, and $U_{502}$–$U_{508}$, and Diodes $D_{202}$–$D_{208}$, $D_{302}$–$D_{306}$, $D_{402}$–$D_{406}$, $D_{500}$–$D_{506}$, $D_{602}$–$D_{606}$, and $D_{702}$–$D_{708}$.

Signal conditioning means 38 compare the signal on input terminal 40 to the voltage already present on each bus (200, 300) and switch the bus voltage higher or lower as needed until the Bus Hi 200 matches the highest signal voltage on input terminal 40 and the Bus Lo 300 voltage matches the lowest signal voltage on input terminal 40. Operation of signal conditioning means 38 is as follows:

The signal from detecting means 14 on input terminal 40 is applied to the "+" input of a series of comparators ($U_{100}$–$U_{108}$). This signal is referred to as an input signal. Applied to each threshold "−" input of these comparators ($U_{100}$–$U_{108}$) is a voltage taken from a voltage divider network 1000 that includes a series of diodes ($D_{100}$–$D_{112}$). These diodes are forward biased by a positive voltage from VCC through resistor $R_{1000}$. Each diode when forward biased has a voltage across it of about 0.7 volts. The threshold voltage on each comparator ($U_{100}$–$U_{108}$) therefore is about 0.7 volts higher than the one below it. The result is that each comparator ($U_{100}$–$U_{108}$) will be on (output high) when the voltage of the input signal is higher than its threshold voltage. All of the comparators having a threshold voltage below the signal voltage will be on, and all those comparators having a threshold voltage above this input signal voltage will be off. For example, should the input voltage be 3.75 volts, comparator $U_{104}$ and all comparators below ($U_{106}$ and $U_{108}$) will be on, and all comparators above ($U_{100}$ and $U_{102}$) will be off.

The output of each comparator ($U_{100}$–$U_{108}$) goes to logic elements 2000–2008. One output goes straight into an AND gate ($U_{302}$–$U_{308}$) in one of the logic elements, and the other goes to an inverter ($U_{200}$–$U_{206}$), then into an input of an AND date below it ($U_{302}$–$U_{308}$) in another of the logic elements. The output of comparator $U_{100}$ goes directly through logic element 2000 to flip-flop $U_{600}$. At only one point will both inputs to any AND gate ($U_{302}$–$U_{308}$) be high. This will be the inputs to the AND gate that is attached to the comparator with an input signal that is higher than the comparator's threshold voltage yet is lower than the threshold voltage of the comparator above it. The comparator feeding the bottom input of the AND gate will deliver a high (ON) voltage, and the comparator above will be off, delivering a low state to the inverter ($U_{200}$14 $U_{206}$) below it that, in turn, delivers a high state to the AND gate below.

For the example above, with a signal of 3.75 volts, comparator $U_{104}$ will be on, $U_{102}$ will be off, and AND gate $U_{304}$ will be on. No other AND gate ($U_{302}$–$U_{308}$) will be on. All comparators ($U_{104}$, $U_{106}$, and $U_{108}$) below comparator $U_{102}$ will be on, delivering a high state to the inverter below them ($U_{204}$ and $U_{206}$) which places a low state on the AND gates ($U_{306}$ and $U_{308}$) below them. None of the comparators ($U_{100}$–$U_{108}$) above comparator $U_{104}$ will be on, delivering a low state to AND gate $U_{302}$ or flip-flop $U_{600}$ connected directly to comparator $U_{100}$ output.

Comparator $U_{7000}$ compares the signal voltage at input 40 and goes into a high on state if the signal voltage is higher than the voltage on Bus Hi 200. The output of comparator $U_{7000}$ is connected to AND gates $U_{402}$–$U_{408}$. The output of whichever AND gate is on in the series of AND gates ($U_{302}$–$U_{308}$) is also applied through steering diodes $D_{202}$–$D_{208}$ to AND gates $U_{402}$–$U_{408}$. The output of AND gates $U_{402}$–$U_{408}$ is then applied through steering diodes $D_{302}$–$D_{308}$ to AND gates $U_{402}$–$U_{408}$ above as well as through steering diodes $D_{800}$–$D_{808}$ to the Reset input of the flip-flop ($U_{600}$–$U_{608}$) above them. If the signal voltage at input 0 is greater than the voltage on Bus Hi 200, one of the Logic elements 2000–2008 will Reset all of the flip-flops ($U_{600}$–$U_{608}$) above it.

Comparator $U_{6000}$ compares the signal voltage at input 40 and goes into a high on state if the signal voltage is lower than the voltage on Bus Lo 300. The output of comparator $U_{5000}$ is connected to AND gates $U_{502}$–$U_{508}$. The output of whichever AND gate is on in the series of AND gates ($U_{302}$–$U_{308}$) is also applied through steering diodes $D_{402}$–$D_{406}$ to AND gates $U_{502}$–$U_{508}$. The output of Comparator $U_{100}$ is connected directly to gate $U_{502}$ and to the Set input of flip-flop $U_{600}$. The output of AND gates $U_{502}$–$U_{508}$ is then applied through steering diodes $D_{602}$–$D_{606}$ to AND gates $U_{502}$–$U_{508}$ below as well as through steering diodes $D_{702}$–$D_{708}$ to the Reset input of the flip-flop ($U_{600}$–$U_{608}$) below them. If the signal voltage at input 40 is less than the voltage on Bus Lo 300, one of the Logic elements 2000–2008, e.g., resetting means for resetting the maximum signal or maximum distance range signal, will Reset all of the flip-flops ($U_{600}$–$U_{608}$) below it.

One of these two comparators $U_{7000}$ or $U_{6000}$ will be on if the input signal is above or below its appropriate bus voltage level. For the example above with a signal voltage of 3.75 volts and assuming a Bus Hi 200 voltage of 2.1 volts, comparator $U_{104}$ will be on, comparator $U_{102}$ will be off, AND gate $U_{304}$ will be on, comparator $U_{7000}$ will be on, and AND gates $U_{404}$ and $U_{402}$ will be on. Assuming a Bus Lo 300 voltage of 4.5 volts, comparator $U_{104}$ will be on, comparator $U_{102}$ will be off, AND gate $U_{304}$ will be on, comparator $U_{6000}$ will be on, and AND gates $U_{506}$ and $U_{508}$ will be on. The result is that only flip-flop $U_{604}$ will be Set, with all other flip-flops $U_{600}$, $U_{602}$, $U_{604}$, and $U_{608}$ being Reset to the off state.

Attached to the Q output of each flip-flop ($U_{600}$–$U_{608}$) is the control input for bus drives 4000–4008 each having a set of analog switches $Q_{200}$–$Q_{208}$ with outputs attached to the Bus Hi 200 and a set of analog switches $Q_{300}$–$Q_{308}$ with outputs attached to the Bus Lo 300 through Diodes $D_{900}$–$D_{908}$. It is preferable that analog switches $Q_{200}$–$Q_{208}$ include NPN transistors. The control input to analog switches $Q_{200}$–$Q_{208}$ and analog switches $Q_{300}$–$Q_{308}$ are resistors $R_{200}$–$R_{208}$ and resistors $R_{300}$–$R_{308}$, respectively. The voltage that is switched on by the analog switches is placed on the collector and is connected to the voltage divider network 5000 at the top of resistor $R_{5002}$ or at the bottom of resistor $R_{5006}$, corresponding to the highest or to the lowest signal level as sensed by the appropriate comparator $U_{100}$–$U_{108}$. When the output of the appropriate flip-flop, $U_{600}$–$U_{608}$, goes high, one analog switch in the group $Q_{200}$–$Q_{208}$ and the corresponding switch in the group $Q_{300}$–$Q_{308}$, attached to each bus will be turned on, placing the collector voltage on the bus.

The Reset circuit 3000 composed of $R_{3002}$, $C_{3002}$, $Q_{3002}$, and $R_{3004}$, along with steering diodes $D_{800}$–$D_{808}$ apply a high state for a short time to the Reset inputs of all the flip-flops $U_{600}$–$U_{608}$ when the power to signal conditioning means 38 is initially turned on. This operates as follows: The VCC voltage is applied to $R_{3002}$ and allows current to flow through capacitor $C_{3002}$. Initially there is no voltage dropped across the capacitor $C_{3002}$, so a low voltage is applied to the base of transistor $Q_{3002}$. This turns the transistor $Q_{3002}$ on and allows the VCC voltage to be impressed onto its emitter. This VCC voltage is attached to the Reset inputs of flip-flops $U_{600}$–$U_{608}$ through steering diodes $D_{800}$-$D_{808}$ and serves to set all Q outputs to a low value. After some time determined by the time constant of resistor $R_{3002}$ and capacitor $C_{3002}$, the voltage on capacitor $C_{3002}$ becomes high enough to reverse bias transistor $Q_{3002}$ and remove the high state from its emitter. This then allows Logic elements 2000–2008 to control the state of flip-flops $U_{600}$–$U_{608}$. This ensures that during initial startup no flip-flops $U_{600}$–$U_{608}$ are on until voltage levels are allowed to attain their true operating conditions, preventing a latchup condition.

Resistor $R_{1000}$ serves to bring the Bus Hi 200 voltage to a low value during initial reset and also serves to help forward bias analog switches $Q_{200}$–$Q_{208}$. Resistor $R_{2000}$ brings the Bus Lo 300 to a high value during initial reset and also helps forward bias Diodes $D_{900}$–$D_{908}$. Resistor $R_{1000}$, in conjunction with the base-emitter junctions of analog switches $Q_{200}$–$Q_{208}$, serves to provide a bias voltage that effectively allows the Bus Hi 200 to select only the highest voltage of the analog switches, regardless of how many analog switches are on. This occurs because should any two analog switches be enabled, the voltage applied from the analog switch with the lower voltage level will be lower in value than the voltage applied from the analog switch above. This lower voltage will tend to turn on the switch above because the base-emitter junction becomes even more forward biased. This will ensure the higher voltage is applied to the Bus Hi 200. This higher voltage will in turn reverse bias all base-emitter junctions, e.g., reverse bias determining means for responsively determining the threshold signal, of the analog switches below it. Resistor $R_{1000}$ provides a path for the bias current to ground that passes through the appropriate base-emitter junction of analog switches $Q_{200}$–$Q_{208}$ and enables it to turn on.

A similar situation occurs on the Bus Lo 300, however, diodes $D_{900}$–$D_{908}$ are the appropriate bias junctions. This allows the voltage on Bus Lo 300 to become the lowest of any switched on by analog switches $Q_{300}$–$Q_{308}$. This in turn allows any number of the analog switches to be turned on, with the analog switch having the lowest value of them being applied to the Bus Lo 300. This occurs as follows: Should any two analog switches $Q_{300}$–$Q_{308}$ be on, the analog switch with the lower voltage applied will reverse bias any diodes $D_{900}$–$D_{908}$ above it, effectively turning them off and not allowing the higher voltage to be passed to the Bus Lo 300. Should any higher analog switch $Q_{300}$–$Q_{308}$ be on, the analog switch $Q_{300}$–$Q_{308}$ will forward bias all diodes $D_{900}$–$D_{908}$ below it, allowing their voltage to be placed on the Bus Lo 300.

Exemplary signal conditioning means 38 operation is as follows: When signal conditioning means 38 is initially turned on, Reset circuit 3000 resets all flip-flops $U_{600}$–$U_{608}$, thus none of analog switches $Q_{200}$–$Q_{208}$ or $Q_{300}$–$Q_{308}$ are turned on to apply voltage to the Bus Hi 200 or to the Bus Lo 300. Resistor $R_{1000}$ provides a path to ground to pull the Bus Hi 200 to a low value (zero volts), and Resistor $R_{2000}$ provides a positive bias to pull the Bus Lo 300 to a high value (VCC—assumed to be 5.0 volts for the purpose of illustration). Assume the input signal on input terminal 40 resembles a sine wave that goes from 3.75 volts up to 4.5 volts, then falls to 2.6 volts and thereafter oscillates between 4.5 volts and 2.6 volts. The initial 3.75 volts turns of comparator $U_{104}$, turns off comparator $U_{100}$ and comparator $U_{102}$. The low state on the output of comparator $U_{100}$ is attached to the Set input of flip-flop $U_{600}$ and allows it to stay in its Reset state, applying a low voltage to analog switches $Q_{200}$ and $Q_{300}$, preventing them from applying their voltages to Bus Hi 200 and Bus Lo 300. Comparator $U_{102}$ supplies a low state to AND gate $U_{302}$, which applies a low state to the Set input of flip-flop $U_{602}$, which keeps its output Q low, turning off Analog switches $Q_{202}$ and $Q_{302}$. Inverter $U_{202}$ changes the low state from comparator $U_{102}$ into a high state and applies it to the top input of AND gate $U_{304}$. This input and the high state from comparator $U_{104}$ cause the output of AND gate $U_{304}$ to go to a high state. The 3.75 volts is higher than the voltage level on Bus Hi 200, so comparator $U_{7000}$ is on. This applies a high state to the left input on AND gates $U_{402}$–$U_{408}$. The high state applied to the right input of AND gate $U_{404}$ by AND gate $U_{304}$ through steering diode $D_{204}$ places AND gate $U_{404}$ into an on condition. This applies a high state to the right input of AND gate $U_{402}$ through steering diode $D_{302}$ which, with the high state on its left input causes its output to go to a high state. The high state from AND gate $U_{404}$ is applied through steering diode $D_{502}$ to the Reset input of flip-flop $U_{602}$, causing its Q output to go low, turning off analog switches $Q_{202}$ and $Q_{302}$. The high state from AND gate $U_{402}$ is applied through steering diode $D_{500}$ to the Reset input of flip-flop $U_{600}$, causing its Q output to go low, turning off analog switches $Q_{200}$ and $Q_{300}$. The high state of AND gate $U_{304}$ is attached directly to the Set input of flip-flop $U_{604}$, causing its Q output to go high. This forward biases analog switches $Q_{204}$ and $Q_{304}$, applying the 3.5 volts on the top of voltage divider diode $D_{104}$ to both Bus Hi 200 and to the cathode of bus drive diode $D_{904}$. Since the voltage on Bus Lo 300 is higher (VCC set by Resistor $R_{2000}$) than the 3.5 volts, diode $D_{904}$ is forward biased, allowing the 3.5 volts to be applied to the Bus Lo 300. This 3.5 volts is lower than the 3.75 volt input signal on terminal 40, so comparator $U_{6000}$ is turned off. This applies a low state to the right input of AND gates $U_{502}$–$U_{508}$, which applies a low state through diodes $D_{702}$–$D_{708}$ to the Reset inputs of flip-flops $U_{602}$–$U_{608}$. The Set input of the flip-flops $U_{600}$–$U_{608}$ has a priority effect on the operation of the device compared to the Reset input. Should both Set and Reset inputs be high, the Set input shall prevail and bring the output Q high. This process applies 3.5 volts to both the Bus Hi 200 and to the Bus Lo 300.

The signal now increases until it passes 4.2 volts, at which time the process for setting Bus Hi 200 voltage again occurs, but only for the series of gates that turn off all flip-flops having a threshold voltage above the input signal voltage level. In the preceding example, comparator $U_{102}$ will turn on, comparator $U_{100}$ will be off, AND gate $U_{302}$ will be on, comparator $U_{7000}$ will turn AND gate $U_{402}$ on, and flip-flop $U_{600}$ will be turned off. Flip-flop $U_{602}$ will turn on and likewise turn on analog switches $Q_{202}$ and $Q_{302}$. This will apply 4.2 volts to the Bus Hi 200. The 4.2 volts will also be applied to the cathode of diode $D_{902}$. Flip-flop $U_{604}$ will remain on, since no Logic element 2000–2008 has acted to reset it. This will keep analog switches $Q_{204}$ and $Q_{304}$ on and attempt to apply 3.5 volts to Bus Hi 200 and Bus Lo 300. This 3.5 volts is lower than the 4.2 volts being applied by analog switch $Q_{202}$, therefore it serves to forward bias analog switch $Q_{202}$. This allows the Bus Hi 200 to rise toward 4.2 volts. This 4.2 volts is higher than the 3.5 volts applied by analog switch $Q_{204}$, causing it to become reverse biased, preventing it from applying its 3.5 volts to the Bus Hi 200. Diode $D_{904}$ will have 3.5 volts on its cathode and 4.2 volts on its anode. This forward biases it and allows the analog switch $Q_{304}$ 3.5 volts to be switched onto Bus Lo 300. In this manner the Bus Hi 200 attains the higher of the two voltages (4.2 volts) and Bus Lo 300 attains the lower (3.5 volts). Nothing will change until the signal peaks and then begins to fall. Bus Lo 300 will never again be higher in value than the voltage level of Bus Hi 200. When the input signal voltage level starts to fall, comparators $U_{100}$ and $U_{102}$ will again change state, but since comparator $U_{7000}$ is off, flip-flops $U_{600}$–$U_{608}$ will not change state. When the signal again falls below 3.5 volts, the signal is now lower than the Bus Lo 300 voltage, resulting in comparator $U_{6000}$ being turned on. Comparator $U_{106}$ will also be turned on and comparator $U_{104}$ will be turned off. This will turn on AND gate $U_{306}$. Comparator $U_{7000}$ will be off, turning off all AND gates $U_{402}$–$U_{408}$, so no flip-flops $U_{600}$–$U_{608}$ above flip-flop $U_{606}$ will be reset. Flip flops $U_{602}$ and $U_{604}$ set by the increasing signal level above will remain in the Set condition, and analog switches $Q_{202}$, $Q_{302}$, $Q_{204}$, and $Q_{304}$ will remain on.

The output of AND gate $U_{306}$ is applied to the Set input of flip-flop $U_{606}$, causing its Q output to turn on analog switches $Q_{206}$ and $Q_{306}$. Bus Hi 200 now has three analog switches $Q_{202}$, $Q_{204}$, and $Q_{206}$ turned on, however, the 2.8 volts applied by analog switch $Q_{206}$ is the lowest of the three, and forward biases both analog switches $Q_{202}$ and $Q_{204}$ above it. Analog switch $Q_{204}$ also forward biases analog switch $Q_{202}$ above it. This allows Bus Hi 200 to retain the highest of the three voltages, 4.2 volts. This voltage is again higher than the collector voltages of analog switches $Q_{204}$ and $Q_{206}$ below, causing them to be turned off.

Analog switch $Q_{306}$ applies 2.8 volts to the cathode of diode $D_{906}$. Since analog switches $Q_{302}$ and $Q_{304}$ are also on, they are trying to apply their voltages (3.5 volts and 4.2 volts) to the Bus Lo 300. These voltages are both higher than the voltage on the cathode of diode $D_{906}$, causing it to be forward biased and allowing the 2.8 volts to be applied to the Bus Lo 300. This 2.8 volts is lower than the voltages on the cathodes of diodes $D_{902}$ and $D_{904}$, turning them off and removing their voltages from the Bus Lo 300. This allows Bus Lo 300 to attain the lowest value regardless of how many flip-flops $U_{600}$–$U_{608}$ are turned on.

The input signal will continue to oscillate from its highest to its lowest value, however, since it never goes above 4.2 volts, comparator $U_{7000}$ will remain off and the Bus Hi 200 voltage will remain at 4.2 volts. Likewise, since it never goes below 2.8 volts, comparator $U_{6000}$ will remain off and the Bus Lo 300 voltage will remain at 2.8 volts.

Bus Hi 200 voltage is applied through a buffer $U_{1000}$ to the top of the voltage divider network 5000. The Bus Lo 300 voltage is applied through buffer $U_{2000}$ to the bottom of the voltage divider network 5000. Switch 6000 selects the appropriate threshold percentage. The 50% signal voltage is selected by connecting the top input of the switch, and the small percentage level is selected by connecting the bottom input. The selected output of voltage divider network 5000 is applied to the threshold input of comparator $U_{8000}$, and the input signal is applied to the signal input. Comparator $U_{8000}$ switches state when the signal passes through the appropriate voltage. The output of comparator $U_{8000}$ is a digital pulse and is applied to the top of switch 6000. The voltage on the bottom of the voltage divider network 5000, which corresponds to the lowest voltage level of the input signal, is applied to one input of amplifier $U_{9000}$. The input signal is applied to the other input. This serves to bring any offset of the input signal down to zero volts. The output of amplifier $U_{9000}$ is an analog waveform that is proportional to the position of the target 30 (FIG. 1). The output of amplifier $U_{9000}$ is applied to the bottom of switch 6002. Depending on the desired operation, one of these outputs (analog or digital) is connected by masking or other means applied to switch 6002 and is then connected to current regulator 44 (FIG. 1).

Two delay networks composed of resistors $R_{6000}$ and capacitor $C_{6000}$ and resistor $R_{7000}$ and capacitor $C_{7000}$ are provided to prevent signal conditioning means 38 from oscillating. If the signal conditioning means 38 respond too rapidly to the input signal, signal conditioning means 38 may change state any number of times. This fluctuating state occurs by changing the Bus Lo 300 or Bus Hi 200 voltage to a value, comparing the signal to this value, then rapidly switching the Bus Lo 300 or Bus Hi 200 voltage numerous times until the signal changes an appreciable amount. These two delay networks also slow the response of signal conditioning means 38, allowing it to respond only to relatively slow moving targets. A rate reducing comparator $C_{100}$ couples input terminal 40 to ground for rapidly changing input signals. This capacitor $C_{100}$, along with delay networks $R_{6000}$, $C_{6000}$, $R_{7000}$, and $C_{7000}$ cause signal conditioning means 38 to be unaffected by rapidly changing noise signals.

Two voltage dropping diodes $D_{1000}$ and $D_{2000}$ serve to compensate for circuit voltage losses. Diode $D_{2000}$ ensures that the Bus Lo 300 will always be lower than the input signal voltage level, even if the voltage divider network 1000 steps do not allow the appropriate selection of voltage. This ensures that the lowest threshold tap voltage is always higher in value than the signal's lowest value. This ensures the output comparator $U_{6000}$ will always switch. Diode $D_{1000}$ ensures that the Bus Hi 200 will always be higher than the input signal voltage level, even if the voltage divider network 1000 steps do not allow the appropriate selection of voltage. This ensures that the highest threshold tap voltage is always lower in value than the signal's highest value. This ensures the output comparator $U_{7000}$ will always switch.

Signal conditioning means 38 are shown with only 5 voltage taps, 2.1V, 2.8V, 3.5V, 4.2V, and 4.9V. Other applications may require different numbers of taps and different values for these voltages. Also, different voltage networks 1000 can be used to obtain these voltages. All analog switch transistors are shown as bipolar, however, any device can be used provided it will pass the appropriate value and provided the bus voltage selection of highest or lowest of any plurality is maintained. These signal conditioning means 38 can be manufactured on a single monolithic circuit as an integral part of a sensor, can be manufactured on a single monolithic circuit as a separate component, or can be laid out on a printed circuit board as a discrete signal conditioning circuit.

Figure 7:
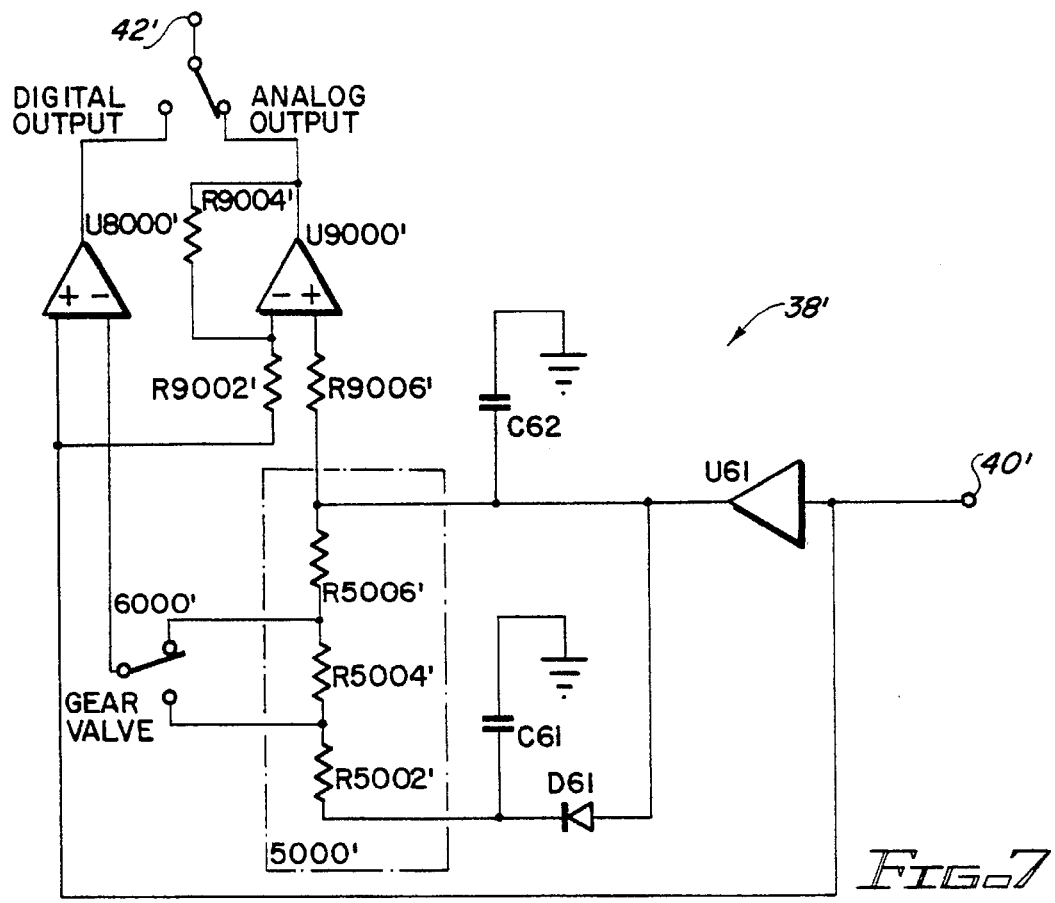
FIG. 7 shows an alternate embodiment of the signal conditioning means shown in FIG. 1 that conditions a signal from the sensor shown in FIG. 2a and generates an output pulse used in sensing the position of a target moving at speeds above zero speed.

Referring to FIG. 7, there are shown alternate signal conditioning means 38' having an input terminal 40' and an output terminal 42'. The input signal voltage from detecting means 14 (FIG. 1) is connected to input terminal 40', then is buffered by buffer $U_{61}$ and applied to the anode of diode $D_{61}$ and to the cathode of diode $D_{62}$. Diode $D_{61}$ passes the highest input signal voltage onto the top of capacitor $C_{61}$, e.g., storing means for the highest or maximum input signal. Diode $D_{62}$ passes the lowest input signal voltage onto the top of capacitor $C_{62}$, e.g., storing means for storing the lowest or minimum input signal. The highest and lowest voltage attained by the input signal is placed on the top and bottom of voltage divider network 5000' composed of resistors $R_{5002}'$, $R_{5004}'$, and $R_{5006}'$. Resistor $R_{5002}'$ is equal in value to the sum of the values of Resistors $R_{5004}'$ and $R_{5006}'$. Resistor $R_{5006}'$ has a value that is a certain percentage of the total sum of the values of resistors $R_{5002}'$, $R_{5004}'$, and $R_{5006}'$. The voltage at the right-hand side of resistor $R_{5002}'$ is therefore halfway between the difference between the highest and the lowest input signal levels. The voltage at the left-hand side of resistor $R_{5006}'$ is some smaller percentage of the difference between the highest and the lowest input signal levels.

Switch 6000' may be realized by mask manipulation and is used to select the voltage halfway between the upper and lower value of the input signal or to select the voltage that is some small percentage of the difference between the upper and lower value of the input signal. Either of these two selected voltages is applied to the threshold input of comparator $U_{8000}'$. The input signal is applied to the signal input. When the input signal passes through the threshold voltage, comparator $U_{3000}'$ switches states. The selection of the voltage to be used is determined by the action of target 30 (FIG. 1). The action generally falls into one of two categories, that of a geartooth or that of a valve. If the sensor is to be used to sense a geartooth, the voltage waveform from the target 30 most closely resembles a sine wave with a 50% duty cycle. The most desirable switching point for comparator $U_{8000}'$ is at a point halfway up the side of the tooth. The connection at the right-hand side of resistor $R_{5002}'$ is therefore used to cause comparator $U_{8000}'$ to switch when the signal voltage is equal to one half of its maximum value. If the sensor is to be used to sense the position of a valve or other small object, the signal voltage will most closely resemble a pulse of varying frequency and duration. The information sought in this case is usually when the valve leaves its rest position and when it returns. For this purpose the connection at the left-hand side of resistor $R_{5006}'$ is used to cause comparator $U_{8000}'$ to switch when the valve is close to its rest position. Comparator $U_{8000}'$ provides a digital pulse at the left input terminal of switch 6002' that represents the time at which target 30 (FIG. 1) passes through the desired position.

The voltage from the right-hand side of resistor $R_{5006}'$ is applied to one input of amplifier $U_{9000}'$ through resistor $R_{9006}'$. The input signal is applied to the other input through resistor $R_{9002}'$. This serves to return any offset of the input signal to zero volts. The output of amplifier U$_{9000}$' is an analog signal representing the position of the target 30 and is attached to one side of output selector switch 6002'. Depending on the desired function of the sensor, switch 6002' is mask programmed and either the digital output from comparator U$_{8000}$' or the analog output from amplifier U$_{9000}$' is connected to current regulator 44 (FIG. 1).

Signal conditioning means 38' as shown in FIG. 7 are used in situations where component count is to be kept to a minimum for the purposes of reducing chip size or cost. Signal conditioning means 38' cannot be used to condition signals from targets moving at or close to zero speed.

This concludes the description of the preferred embodiments. A reading by those skilled in the art will bring to mind various changes without departing from the spirit and scope of the invention. It is intended, however, that the invention only be limited by the following appended claims.

What is claimed is:

1. An apparatus for sensing the position of a moving target, the apparatus comprising:

detecting means for detecting a distance signal representative of a range of distances between a reference point and a moving target;

maximum and minimum generating means responsive to said detecting means for generating a maximum distance range DC voltage signal representative of a maximum distance range value between a reference point and a moving target and for generating a minimum distance range DC voltage signal representative of a minimum distance range value between a reference pint and a moving target;

storing means responsive to the maximum distance range signal and the minimum distance range signal for storing the maximum and minimum distance range DC voltage signals during a predetermined time period;

range value generating means responsive to said storing means for generating a range value signal having an amplitude representative of a range value between the maximum distance range value and the minimum distance range value; and output generating means responsive to the range value signal for generating an output signal representative of the distance between a reference point and a moving target when the amplitude of the range value signal exceeds a predetermined threshold.

2. The apparatus for sensing the position of a moving target as recited in claim 1, wherein the output signal changes responsive to the amplitude of the range value signal falling below the predetermined threshold.

3. The apparatus for sensing the position of a moving target as recited in claim 1, wherein said range value generating means changes the maximum distance range signal when the range value signal amplitude exceeds the maximum distance range signal amplitude, and wherein said range value generating means changes the minimum distance range signal when the amplitude of the range value signal is less than the minimum distance range signal amplitude.

4. The apparatus for sensing the position of a moving target as recited in claim 3, further comprising resetting means for resetting the maximum distance range signal to an amplitude less than the amplitude of the minimum distance range signal.

5. An apparatus for sensing the position of a moving target having an undulating surface, the apparatus comprising:

a transmitter for transmitting a radio frequency signal from a reference point to a moving target having an undulating surface;

a sensor responsive to the radio frequency signal reflecting from the undulating surface of the moving target for sensing a range of distances between a reference point and an undulating surface of a moving target, the sensor including:

a detector for detecting a distance signal representative of a range of distances between a reference point and an undulating surface of a moving target, a maximum and minimum generator responsive to the detector for generating a maximum distance range voltage signal representative of a maximum distance range value between a reference point and an undulating surface of a moving target and for generating a minimum distance range voltage signal representative of a minimum distance range value between a reference point and an undulating surface of a moving target, a memory device responsive to the maximum distance range signal and the minimum distance range signal for storing the maximum and minimum distance range voltage signals during a predetermined time period, a range value generator responsive to the memory device for generating a range value signal having an amplitude representative of a range value between the maximum distance range value and the minimum distance range value, and an output signal generator responsive to the range value signal for generating an output signal when the amplitude of the range value signal exceeds a predetermined threshold.

6. The apparatus for sensing the position of a moving target as defined in claim 5, wherein the transmitter comprises a transmitter for radiating radio frequency energy at the moving target to electromagnetically charge the surface of the target so that the resistance component of the impedance of the transmitter changes responsive to changes in position of the target.

7. The apparatus for sensing the position of a moving target as defined in claim 6, wherein said detector detects changes in the resistance component of the impedance, and wherein the distance signal indicates that the position of the moving target has changed responsive to the changes in the resistance component of the impedance being detected.

8. An apparatus for sensing the proximity of a moving gear, the apparatus comprising:

detecting means for detecting when a tooth of a moving gear is positionally aligned with a reference point and when a valley of a moving gear is positionally aligned with the reference point;

maximum and minimum generating means responsive to the detected gear tooth and the detected gear valley for generating an electrical signal including a DC voltage level has a maximum amplitude representative of the distance between the reference point and a gear wherein the DC voltage level has a maximum amplitude when a gear tooth is positionally aligned with the reference point and wherein the DC voltage level has a minimum voltage level when the gear valley is positionally aligned with the reference point;

storing means responsive to the maximum distance range signal and the minimum distance range signal for storing the maximum and minimum distance range DC voltage signals during a predetermined time period;

range value generating means responsive to said storing means for generating a range value signal having a voltage level with an amplitude representative of a range value between the maximum distance range value and the minimum distance range value;

threshold generating means responsive to said storing means for generating a threshold signal having a voltage level with amplitude corresponding to the approximate mid-point between said maximum distance range signal value and said minimum distance range signal value; and output generating means for generating an output signal having a first predetermined voltage level when the amplitude of the range value signal exceeds the amplitude of the threshold signal, and having a second predetermined voltage level when the amplitude of the first signal is less than the amplitude of the threshold signal.

9. The apparatus for sensing the position of a moving gear as defined in claim 8, wherein said threshold generating means includes threshold signal maintaining means for maintaining the threshold signal responsive to said detecting means detecting movement of the gear approximating zero.

10. The apparatus for sensing the position of a moving gear as defined in claim 9, wherein said threshold signal generating means further includes reverse bias determining means having at least one transistor for determining the threshold signal responsive to a reverse bias signal being applied to said at least one transistor.

* * * * *